(12) United States Patent
Anderson

(10) Patent No.: US 7,608,118 B2
(45) Date of Patent: Oct. 27, 2009

(54) PRECONDITIONING FUEL CELL MEMBRANE ELECTRODE ASSEMBLIES

(75) Inventor: Bradley P. Anderson, Andover, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 799 days.

(21) Appl. No.: 10/988,811

(22) Filed: Nov. 15, 2004

(65) Prior Publication Data

US 2006/0105214 A1     May 18, 2006

(51) Int. Cl.
*H01M 4/82* (2006.01)
*H01M 6/00* (2006.01)

(52) U.S. Cl. .................. 29/623.2; 29/623.1; 429/27

(58) Field of Classification Search ............... 29/623.2, 29/623.1; 429/27
See application file for complete search history.

(56) References Cited

U.S. PATENT DOCUMENTS

| | | | | |
|---|---|---|---|---|
| 5,164,060 | A | * | 11/1992 | Eisman et al. ............... 204/282 |
| 5,752,988 | A | * | 5/1998 | Okamoto et al. ........... 29/623.5 |
| 5,879,827 | A | | 3/1999 | Debe et al. |
| 5,879,828 | A | | 3/1999 | Debe et al. |
| 6,040,077 | A | | 3/2000 | Debe et al. |
| 6,042,959 | A | | 3/2000 | Debe et al. |
| 6,319,293 | B1 | | 11/2001 | Debe et al. |
| 6,425,993 | B1 | | 7/2002 | Debe et al. |
| 6,624,328 | B1 | | 9/2003 | Guerra |
| 2003/0224226 | A1 | | 12/2003 | Jia et al. |
| 2004/0116742 | A1 | | 6/2004 | Guerra |
| 2004/0121210 | A1 | | 6/2004 | Hamrock et al. |

FOREIGN PATENT DOCUMENTS

| | | |
|---|---|---|
| EP | 0961334 | 12/1999 |
| GB | 2362500 | 11/2001 |
| JP | 06196187 | 7/1994 |
| JP | 2000003718 | 1/2000 |
| WO | WO 02/061871 A2 | 8/2002 |

OTHER PUBLICATIONS

G. Vernstrom; U.S. Appl. No. 10/674,594, filed Sep. 29, 2003, pp. 1-20.
R. D. Anderson, U.S. Appl. No. 10/988,740, filed Nov. 15, 2004, pp. 1-11.

* cited by examiner

*Primary Examiner*—Patrick Ryan
*Assistant Examiner*—Julian Mercado
(74) *Attorney, Agent, or Firm*—Philip Y. Dahl

(57) ABSTRACT

A method is presented for preconditioning fuel cell membrane electrode assemblies for use in fuel cell systems which includes exposure to saturated steam at superatmospheric pressures, typically for at least 10 minutes and more typically at least 25 minutes. Typically, the preconditioning method according to the present invention results in reduction of the start up or conditioning time required when the MEA's are first installed in a fuel cell system and improvement of overall performance, as reflected in the achievement of high current density at relatively high voltage. The method may additionally include the step of enclosing the fuel cell membrane electrode assembly in a container which is substantially impervious to water before the fuel cell membrane electrode assembly returns to ambient temperature.

20 Claims, 2 Drawing Sheets

PRECONDITIONING FUEL CELL MEMBRANE ELECTRODE ASSEMBLIES

FIELD OF THE INVENTION

This invention relates to a method of preconditioning fuel cell membrane electrode assemblies for use in fuel cell systems which includes exposure to saturated steam at superatmospheric pressures.

SUMMARY OF THE INVENTION

Briefly, the present invention provides a method of preconditioning a fuel cell membrane electrode assembly comprising the steps of: a) providing a fuel cell membrane electrode assembly; and b) exposing the fuel cell membrane electrode assembly to saturated steam at a treatment pressure which is at least 110 kPa, more typically at least 130 kPa, more typically at least 170 kPa, and most typically at least 200 kPa. The duration of step b) is typically at least 10 minutes and more typically at least 25 minutes. The method may or may not include the additional step of enclosing the fuel cell membrane electrode assembly in a container, which may or may not be impervious to water or substantially impervious to water, within 96 hours after step b), more typically within 1 hour after step b), more typically after step b) but before the fuel cell membrane electrode assembly returns to ambient temperature. The container may or may not include a humidifying element.

DETAILED DESCRIPTION

Figure 1:
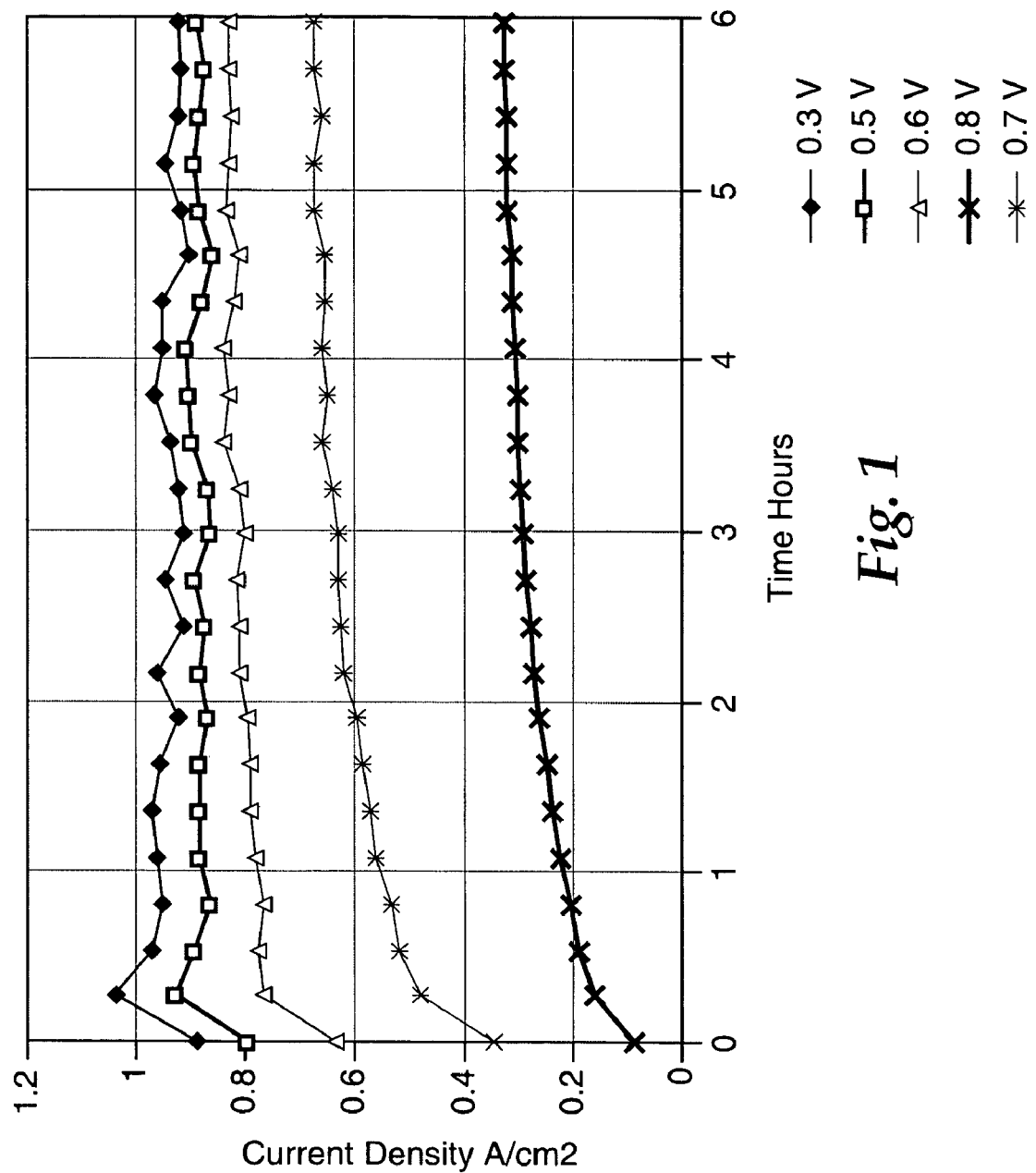
FIG. 1 is a graph containing log plots of potentiodynamic scans at various voltages for an MEA preconditioned according to the present invention.

The present invention provides a method for preconditioning fuel cell membrane electrode assemblies (MEA's). Typically, the preconditioning method according to the present invention results in reduction of the start up or conditioning time required when the MEA's are first installed in a fuel cell system and improvement of overall performance, as reflected in the achievement of high current density at relatively high voltage.

A membrane electrode assembly (MEA) is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting 3-layer MEA sandwiched with two GDL's to form a five-layer MEA. The 3-layer MEA may also be called a catalyst-coated membrane (CCM). The five layers of a five-layer MEA are, in order: anode GDL, anode electrode layer, PEM, cathode electrode layer, and cathode GDL. A 7-layer MEA may be made by addition of appropriate gaskets to each side of a 5-layer MEA. MEA's may additionally include other functional layers, which might include hard stops, hydrophilic or hydrophobic coatings, adhesives, and the like.

Any suitable MEA may be used in the practice of the present invention, including 3-, 5- and 7-layer MEA's with or without GDL's, gaskets, hard stops, hydrophilic or hydrophobic coatings, adhesives, and the like.

The MEA may comprise any suitable PEM, including non-fluorinated, highly fluorinated and perfluorinated PEM's with or without support matrices, such as porous PTFE support matrices. The PEM may comprise any suitable polymer electrolyte. Typical polymer electrolytes useful in fuel cells bear anionic functional groups bound to a common backbone, which are typically sulfonic acid groups but may also include carboxylic acid groups, imide groups, amide groups, or other acidic functional groups. Typical polymer electrolytes are copolymers of tetrafluoroethylene and one or more fluorinated, acid-functional comonomers. Typical polymer electrolytes include NAFION® (DuPont Chemicals, Wilmington Del.) and FLEMION™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—CF=$CF_2$, described in U.S. patent application Ser. Nos. 10/322,254, 10/322,226 and 10/325,278, which are incorporated herein by reference. The polymer typically has an equivalent weight (EW) of 1200 or less, more typically 1100 or less, more typically 1000 or less, and more typically 900 or less. In addition to fluorinated membranes, membranes useful in the present invention include hydrocarbon polymers, including aromatic polymers. Examples of useful hydrocarbon polymers include sulfonated polyetheretherketone, sulfonated polysulfone, and sulfonated polystyrene.

The polymer can be formed into a PEM by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion may be in any suitable solvent system. The electrolyte dispersion is typically an aqueous dispersion, which may additionally contain NMP (n-methyl-2-pyrrolidone), alcohols or polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

Alternately, the MEA may comprise nanostructured catalysts on high-aspect ratio supports as described in U.S. Pat. Nos. 6,425,993, 6,042,959, 6,042,959, 6,319,293, 5,879,828, 6,040,077 and 5,879,827 and U.S. patent application Ser. No. 10/674,594, incorporated herein by reference.

To make a 3-layer MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Alternately, catalyst may be applied to the GDL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: TORAY™ Carbon Paper, SPECTRACARB™ Carbon Paper, AFN™ non-woven carbon cloth, ZOLTEK™ Carbon Cloth, and the like. The GDL may be coated or impregnated with various materials, which may include carbon particle coatings, hydrophilizing treatments, and hydrophobizing treatments such as coating with polytetrafluoroethylene (PTFE).

To make an MEA, GDL's may be applied to either side of a CCM by any suitable means. Alternately, catalyst coated GDL's may be applied to either side of a PEM by any suitable means.

In the method according to the present invention, an MEA is exposed to saturated steam at superatmospheric pressures. Saturated steam is steam at the temperature of its boiling point, for its given pressure. Saturated steam can co-exist with water at the same temperature and pressure. The temperature and pressure of saturated steam have a fixed relationship; given one value, the other can be calculated. In the method according to the present invention, typically the pressure is at least 110 kPa (corresponding to a temperature of at least 102.3° C.), more typically at least 130 kPa (corresponding to a temperature of at least 107.1° C.), more typically at least 150 kPa (corresponding to a temperature of at least 111.4° C.), more typically at least 170 kPa (corresponding to a temperature of at least 115.2° C.), more typically at least 190 kPa (corresponding to a temperature of at least 118.7° C.), and most typically at least 200 kPa (corresponding to a temperature of at least 120.2° C.). Typically, treatment conditions are chosen so as to avoid any heat damage to the MEA that results in undesirable overall performance of the MEA.

Any suitable treatment apparatus may be used, including autoclaves, pressure cookers, and the like. Any suitable water or steam sources may be used. Treatment apparatus adapted for continuous or batch-wise treatment may be used.

Any suitable duration of treatment may be used. Typically, the duration of treatment is at least one minute, more typically at least 5 minutes, more typically at least 10 minutes, more typically at least 15 minutes, and more typically at least 25 minutes. The duration of treatment may be reduced when thinner MEA's or higher pressures are used.

In one embodiment of the present invention, the preconditioned MEA is sealed or enclosed in a container shortly after treatment. In one such embodiment, this container contains a humidifying element as disclosed in copending U.S. patent application Ser. No. 10/988,740, filed on Nov. 15, 2004, published as U.S. patent publication 2004/0105219-A1 on May 18, 2006, the disclosure of which is incorporated herein by reference. The container may be made of any suitable material, which may be impervious to water, substantially impervious to water, airtight, substantially airtight, modified atmosphere packaging, watertight, substantially watertight or none of the above. "Impervious to water" means impervious to both liquid water and water vapor. Typically the material of the container is impervious to water or substantially impervious to water. The material of the container may be rigid or flexible. The material of the container may be single- or multiwall. The interior of the container may optionally comprise release materials or coatings. In one embodiment, the preconditioned MEA is enclosed in the container after treatment and before returning to ambient temperature. In a further embodiment, the preconditioned MEA is enclosed in the container within 10 minutes of treatment. In a further embodiment, the preconditioned MEA is enclosed in the container within 1 hour of treatment. In a further embodiment, the preconditioned MEA is enclosed in the container within 24 hours of treatment. In a further embodiment, the preconditioned MEA is enclosed in the container within 96 hours of treatment.

In one embodiment of the present invention, the preconditioned MEA is used to assemble a fuel cell stack shortly after treatment. In one such embodiment, this stack includes a humidifying element as disclosed in copending U.S. patent application Ser. No. 10/988,740, filed on Nov. 15, 2004, published as U.S. patent publication 2004/0105219-A1 on May 18, 2006, the disclosure of which is incorporated herein by reference. In one embodiment, the preconditioned MEA is incorporated into a fuel cell stack after treatment and before returning to ambient temperature (typically room temperature). In a further embodiment, the preconditioned MEA is incorporated into a fuel cell stack within 10 minutes of treatment. In a further embodiment, the preconditioned MEA is incorporated into a fuel cell stack within 1 hour of treatment. In a further embodiment, the preconditioned MEA is incorporated into a fuel cell stack within 24 hours of treatment. In a further embodiment, the preconditioned MEA is incorporated into a fuel cell stack within 96 hours of treatment.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, WI., or may be synthesized by known methods.

Membrane Electrode Assembly (MEA) Fabrication 5-layer MEA's having 50 cm$^2$ of active area were prepared as follows. Catalyst dispersions were prepared according to the method described in WO 2002/061,871, incorporated herein by reference. To prepare catalyst-coated membranes, anode and cathode layers were applied to membranes according to the decal transfer method described in the same reference, WO 2002/061,871. PTFE-treated carbon paper gas diffusion layers and polytetrafluoroethylene/glass composite gaskets were applied to the CCM by pressing in a Carver Press (Fred Carver Co., Wabash, IN.) with 13.4 kN of force at 132° C. for 10 minutes.

MEA Preconditioning

Five 5-layer MEA's, made as described above, were placed in a steam autoclave (AMSCO CENTURY SG-116; AMSCO is now owned by STERIS Corporation, Mentor, OH) supplied with steam from a house generator for exposure to saturated steam at 121° C. For saturated steam, the pressure corresponding to 121° C. is 205 kPa. Time of exposure to saturated steam at 121° C. was 30 minutes. Total cycle time was about 1 hour.

Four of the autoclaved MEA's slightly buckled during removal from the autoclave. They were flattened by placing them between the pages of a lab notebook with a weight on top overnight. The fifth MEA was tested for performance as noted following.

MEA Performance Testing

The preconditioned MEA was mounted in a test station with independent controls of gas flow, pressure, relative humidity, and current or voltage (Fuel Cell Technologies, Albuquerque, N. Mex.). The test fixture included graphite current collector plates with quad-serpentine flow fields. The anode gas was 800 sccm H$_2$ and the cathode gas was 1800 sccm air, with 100% RH in both anode and cathode gases. Cell temperature was 70° C. The test protocol holds the cell at 0.5 V for 10 minutes and then runs a potentiodynamic scan (PDS) from 0.9 Volts to 0.3 volts, holding for about 5 seconds per point and using 0.05 volt increments. FIG. 1 shows log plots of the PDS scans at 0.3, 0.5, 0.6, 0.7 and 0.8 V over time. When the curves level out, the MEA is fully conditioned. For comparison, FIGS. 2 and 3 are a similar plots taken in the same manner for comparative MEA's which were identical except that they were not preconditioned.

Figure 2:
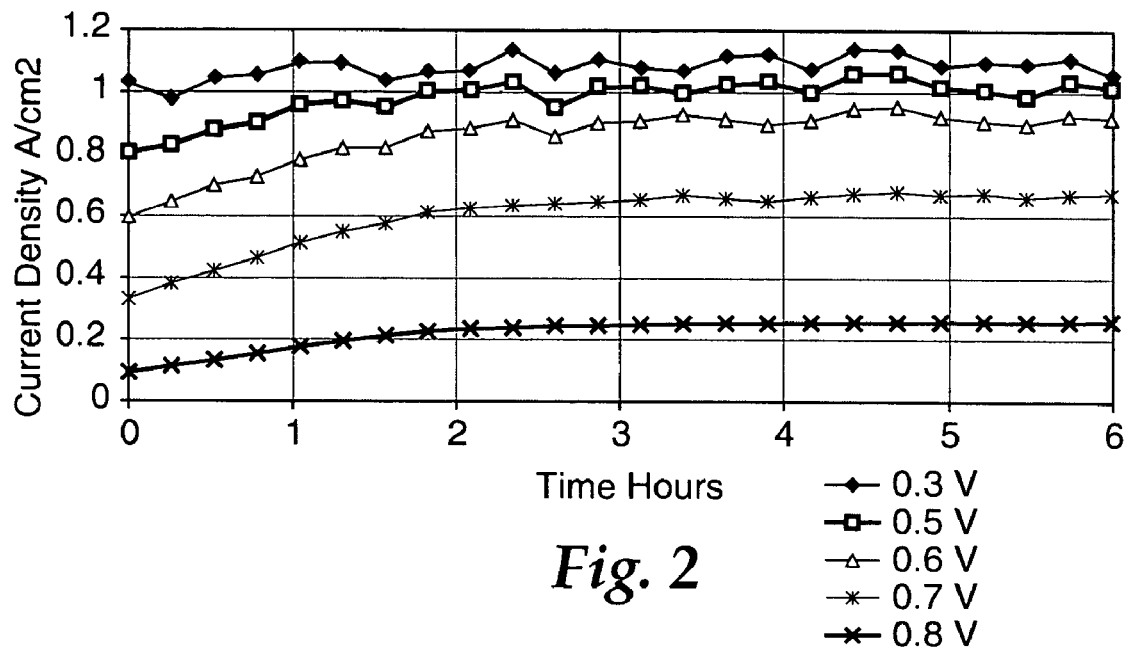
FIG. 2 is a graph containing log plots of potentiodynamic scans at various voltages for a comparative non-preconditioned MEA.
Figure 3:
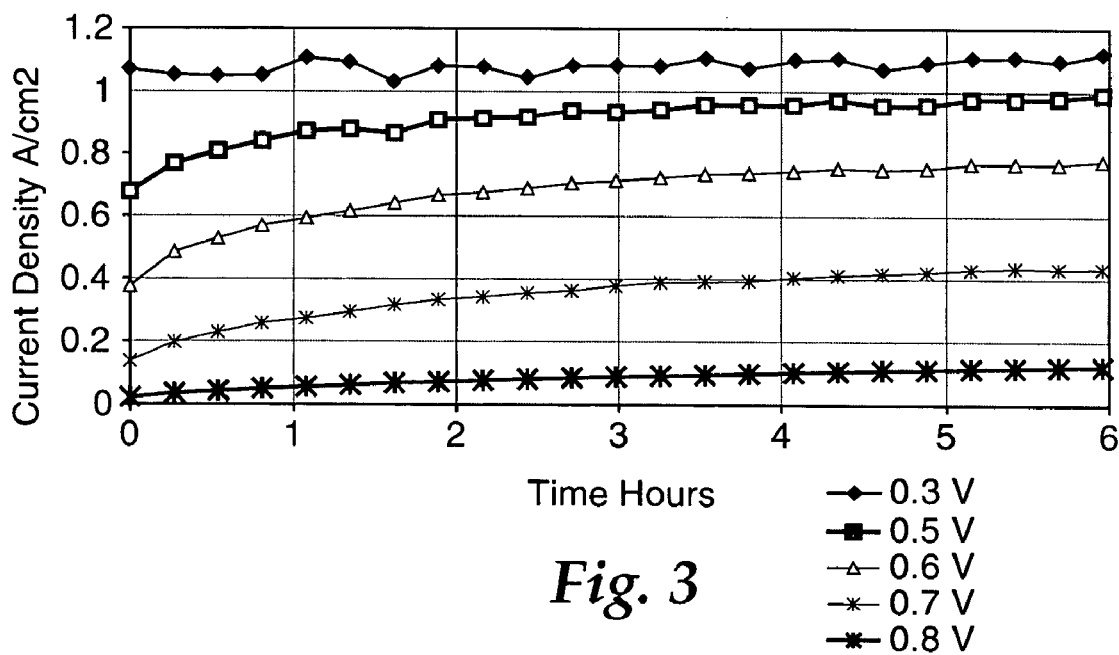
FIG. 3 is a graph containing log plots of potentiodynamic scans at various voltages for a comparative non-preconditioned MEA.

A comparison of FIG. 1 with FIGS. 2 and 3 indicates that the preconditioned MEA started up faster than the non-conditioned MEA's. Note that flooding of the MEA may dominate the voltage performance at higher current densities, and therefore the data collected at middle- or low range current densities may better reflect the voltage performance of the MEA. In particular, the 0.8V and 0.7V traces of FIGS. 1-3 demonstrate not only superior start up performance for the preconditioned MEA but also superior performance as reflected in higher current density achieved at a given voltage.

Various modifications and alterations of this invention will become apparent to those skilled in the art without departing from the scope and principles of this invention, and it should be understood that this invention is not to be unduly limited to the illustrative embodiments set forth hereinabove.

I claim:

1. A method of preconditioning a fuel cell membrane electrode assembly comprising the steps of:
   a) providing a fuel cell membrane electrode assembly; and
   b) exposing the fuel cell membrane electrode assembly to saturated steam at a treatment pressure which is at least 110 kPa.

2. The method according to claim 1 wherein the treatment pressure is at least 130 kPa.

3. The method according to claim 1 wherein the treatment pressure is at least 170 kPa.

4. The method according to claim 1 wherein the treatment pressure is at least 200 kPa.

5. The method according to claim 4 wherein step b) has a duration which is at least 10 minutes.

6. The method according to claim 4 wherein step b) has a duration which is at least 25 minutes.

7. The method according to claim 6, additionally comprising the step of:
   c) enclosing the fuel cell membrane electrode assembly in a container within 96 hours after step b).

8. The method according to claim 6, additionally comprising the step of:
   d) enclosing the fuel cell membrane electrode assembly in a container substantially impervious to water within 96 hours after step b).

9. The method according to claim 6, additionally comprising the step of:
   e) enclosing the fuel cell membrane electrode assembly in a container substantially impervious to water within 1 hour after step b).

10. The method according to claim 6, additionally comprising the step of:
    f) enclosing the fuel cell membrane electrode assembly in a container substantially impervious to water after step b) but before the fuel cell membrane electrode assembly returns to ambient temperature.

11. The method according to claim 6, additionally comprising the step of:
    g) enclosing the fuel cell membrane electrode assembly in a container which includes a humidifying element within 96 hours after step b).

12. The method according to claim 6, additionally comprising the step of:
    h) enclosing the fuel cell membrane electrode assembly in a container substantially impervious to water which includes a humidifying element after step b) but before the fuel cell membrane electrode assembly returns to ambient temperature.

13. The method according to claim 1 wherein step b) has a duration which is at least 10 minutes.

14. The method according to claim 1 wherein step b) has a duration which is at least 25 minutes.

15. The method according to claim 1, additionally comprising the step of:
    c) enclosing the fuel cell membrane electrode assembly in a container within 96 hours after step b).

16. The method according to claim 1, additionally comprising the step of:
    d) enclosing the fuel cell membrane electrode assembly in a container substantially impervious to water within 96 hours after step b).

17. The method according to claim 1, additionally comprising the step of:
   e) enclosing the fuel cell membrane electrode assembly in a container substantially impervious to water within 1 hour after step b).

18. The method according to claim 1, additionally comprising the step of:
   f) enclosing the fuel cell membrane electrode assembly in a container substantially impervious to water after step b) but before the fuel cell membrane electrode assembly returns to ambient temperature.

19. The method according to claim 1, additionally comprising the step of:
   g) enclosing the fuel cell membrane electrode assembly in a container which includes a humidifying element within 96 hours after step b).

20. The method according to claim 1, additionally comprising the step of:
   h) enclosing the fuel cell membrane electrode assembly in a container substantially impervious to water which includes a humidifying element after step b) but before the fuel cell membrane electrode assembly returns to ambient temperature.

* * * * *

UNITED STATES PATENT AND TRADEMARK OFFICE
CERTIFICATE OF CORRECTION

PATENT NO. : 7,608,118 B2
APPLICATION NO. : 10/988811
DATED : October 27, 2009
INVENTOR(S) : Bradley P. Anderson Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1339 days.

Signed and Sealed this

Twelfth Day of October, 2010

David J. Kappos
*Director of the United States Patent and Trademark Office*